United States Patent [19]

Yamazaki

[11] Patent Number: 5,777,307
[45] Date of Patent: Jul. 7, 1998

[54] OPTICAL INFORMATION RECORDING WITH PREFORMATTED SYNCHRONIZATION SIGNALS AND INFORMATION RECORDING AND REPRODUCING METHOD

[75] Inventor: Koichi Yamazaki, Sakado, Japan

[73] Assignee: Nippon Conlux Co., Ltd., Tokyo, Japan

[21] Appl. No.: 610,253

[22] Filed: Mar. 4, 1996

[30] Foreign Application Priority Data

Mar. 10, 1995 [JP] Japan ................................. 7-079632

[51] Int. Cl.⁶ .................................................. G06K 7/10
[52] U.S. Cl. ........................ 235/454; 235/474; 235/494; 369/32
[58] Field of Search ........................ 235/454, 437, 235/449, 456, 474, 476, 477, 493, 494; 369/32, 47, 48, 44.28

[56] References Cited

U.S. PATENT DOCUMENTS

| | | | |
|---|---|---|---|
| 4,885,458 | 12/1989 | Horiguchi et al. | 235/454 |
| 4,910,725 | 3/1990 | Drexler et al. | 235/454 X |
| 4,979,159 | 12/1990 | Tsuruoka et al. | 235/494 X |
| 5,008,552 | 4/1991 | Kuramochi et al. | 235/483 |
| 5,113,061 | 5/1992 | Tanaka | 235/454 |
| 5,132,522 | 7/1992 | Oshiba | 235/454 |
| 5,222,058 | 6/1993 | Oshiba | 235/454 X |
| 5,274,615 | 12/1993 | Rokutan | 235/454 X |
| 5,341,354 | 8/1994 | Horiguchi | 235/454 X |
| 5,383,170 | 1/1995 | Horiguchi et al. | 235/454 X |
| 5,410,137 | 4/1995 | Ichikawa | 235/454 X |
| 5,436,879 | 7/1995 | Yamada | 235/454 X |
| 5,451,762 | 9/1995 | Hayashi | 235/454 X |
| 5,461,719 | 10/1995 | Hosoya | 235/454 X |

FOREIGN PATENT DOCUMENTS

| | | | |
|---|---|---|---|
| 59180626 | 10/1984 | European Pat. Off. | G06F 3/08 |
| 0 269 387 | 6/1988 | European Pat. Off. | G11B 7/007 |
| 0 277 655 | 8/1988 | European Pat. Off. | G11B 7/013 |
| 52055617 | 7/1997 | European Pat. Off. | G11B 5/09 |

Primary Examiner—Donald T. Hajec
Assistant Examiner—Michael G. Lee
Attorney, Agent, or Firm—Graham & James LLP

[57] ABSTRACT

Each information recording track has pre-formatted fore and rear header sections containing address information identifying the track, which permit each of the recording tracks to be accessed from either of the header sections. A predetermined synchronization signal is pre-formatted in a storing area for each frame having a predetermined data size, so that information can be non-rewritably recorded onto the storing area for a predetermined frame by referring to the pre-formatted synchronization signal. With this arrangement, data can be recorded onto a selected information recording track in either of the directions of relative reciprocating movement of the recording medium to a recording/reproducing head, and thus the recording speed can be increased. The arrangement also allows data to be recorded even when one of the header sections has become unreadable due to some defect of the recording medium, and prevents occurrence of jitters in reproduced signals by allowing data to be recorded accurately at predetermined locations for each of the frames.

12 Claims, 5 Drawing Sheets

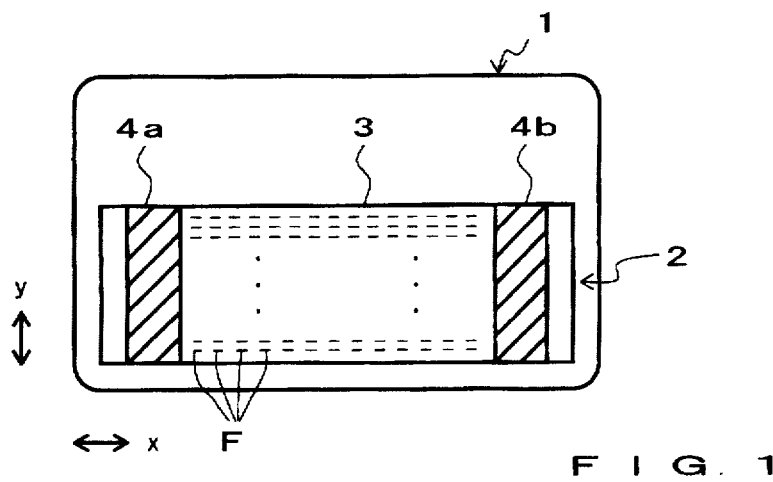
F I G. 1
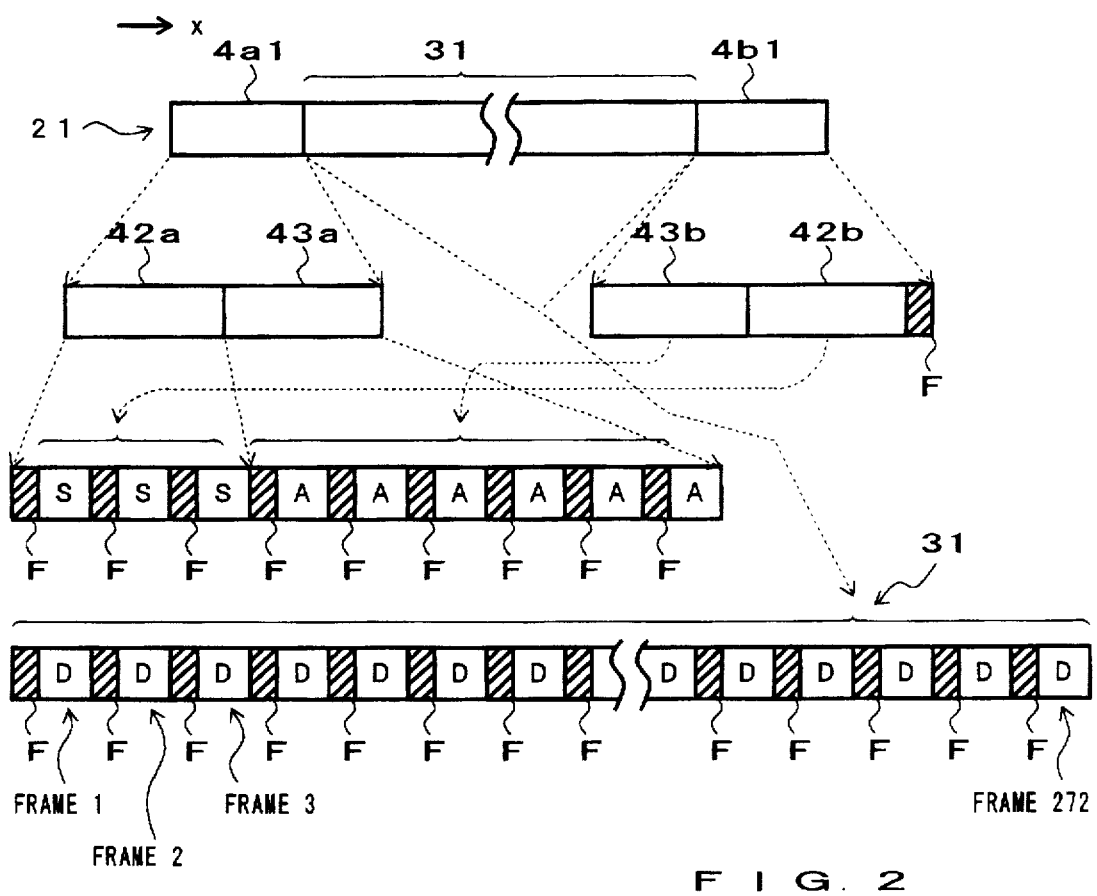
F I G. 2

| FRAME 1 | FRAME 2 | ...... | FRAME 272 |
|---|---|---|---|
| F, a1, b1, c1, ... n1 | F, a2, b2, c2, ... n2 | ...... F, | a272, b272, c272, ... n272 |

| 1 DATA TRACK | | | |
|---|---|---|---|
| LEAD-IN 48 BITS ×3 | BOS 48 BITS ×6 | DATA RECORDING AREA 48BITS × 272 | LEAD-IN 48 BITS ×3 |

OPTICAL INFORMATION RECORDING WITH PREFORMATTED SYNCHRONIZATION SIGNALS AND INFORMATION RECORDING AND REPRODUCING METHOD

BACKGROUND OF THE INVENTION

The present invention relates generally to properly pre-formatted information recording media and methods of recording and reproducing information onto and from such pre-formatted information recording media. More particularly, the present invention is concerned with a technique which is applicable to write-once information recording media to improve the data storing efficiency, recording accuracy and burst-error correcting capability of the media.

In recording data onto an information recording medium such as an optical card, it is usually desirable to maximize the recording density from the economical point of view. However, as the recording density is increased, there would occur more errors in reproduced data due to various defects of the recording medium.

As an approach to reduce such reproduced data errors, it has been proposed to add error correction codes to data to be recorded so that the reproduced data errors can be corrected by reference to the added error correction codes. The reproduced data errors generally include "random errors" occurring randomly, and "burst errors" occurring in successive groups. While the random errors can be corrected relatively easily by use of the error correction codes, the burst errors can often not be corrected by the proposed approach because of their successive nature.

In order to permit correction of the burst errors, it has been conventional to perform recording based on an interleave technique in such a manner that a series of data is divided into individual data pieces and scatteringly recorded onto the information recording medium. By recording the data scatteringly, successive errors on the recording medium in effect appear randomly and hence can be corrected in virtually the manner as the random errors.

Where an optical card is used as a recording medium, a plurality of information units (sectors) are usually recorded onto a data track. But, as the number of sectors on the data track is increased, the length of the individual sectors would become shorter and the number of interleaves (i.e., the amount of information that can be mixedly contained within each sector) would decrease. This results in reduced scattering of the recorded data and hence in reduced error correction capability.

Such inconveniences may be eliminated and error correction capability may be increased by increasing the number of interleaves while maintaining long-enough sector lengths. However, when relatively short data are to be recorded and if the number of interleaves is small in the data to be actually recorded, the conventional interleave technique would record the short data from the beginning of a sector in a packed condition, wastefully leaving a considerable amount of unrecorded area in the rear end portion of the sector, and this undesirably lowers the data storing efficiency. If new data is to be recorded onto the unrecorded area left in the rear end portion, the new data would unavoidably be interleaved in a different manner from the data recorded in the fore end portion of the sector.

To provide a solution to the above-mentioned problem, Japanese Patent Application No. HEI 6-44032 proposes the following recording format. According to the proposed recording format, as shown in FIG. 7, a series of information to be recorded is reorganized as 40 packets or rows (packet 1 to packet 40) each having a size of 272 bits: 190-bit data denoted in FIG. 7 as by "a1, a2, a3, . . . a190"; and 82-bit error correction codes denoted in FIG. 7 as by "a191, . . . a272". Then, as shown in FIG. 8, an 48-bit frame is created which comprises an 8-bit synchronization signal F and 40 first-bit data of the individual packets and is serially arranged in the order of "F, a1, b1, c1, . . . n1". Similarly, another 48-bit frame is created which comprises an 8-bit synchronization signal F and 40 second-bit data of the individual packets and is serially arranged in the order of "F, a2, b2, c2, . . . n2", another 48-bit frame is created which comprises an 8-bit synchronization signal F and 40 third-bit data of the individual packets and is serially arranged in the order of "F, a3, b3, c3, . . . n3", and so on. In this manner, a total of 272 frames are created and serially connected to ultimately form a data train of 13,056 (48×272) bits, which is recorded onto a single data track of the optical card.

With the proposed recording format, because each frame is fixed at a predetermined data size, a maximal number of interleaves can be set and maintained. Further, because even short data are recorded scatteringly in each of the frames and new data can be non-rewritably interleaved onto unrecorded areas of the individual frames (i.e., even when packets 1–3 have been recorded, packet 4 and following packets are left in a scattering state so as to be interleaved), the recording efficiency can be significantly enhanced while maximizing the error correction capability.

The data recording area in one track has a size of 48×373=13,056 bits, and a header section is pre-formatted at the fore end of each track, which, as shown in FIG. 9, includes a lead-in section for bit synchronization and a BOS (Beginning of Sector) section storing address information etc. A similar lead-in section is also pre-formatted at the rear end of the track. That is, the lead-in sections are pre-recorded or pre-formatted on both sides of the data recording area of each track, with the BOS section being interposed between one of the lead-in sections and recording area.

However, because the known optical card format has the BOS section pre-formatted next to only one end portion thereof, data can be recorded only when the optical card is moved relative to the head just in one particular direction although the optical card reciprocates in two directions, and this results in poor efficiency. When the information recorded on the BOS section can not be read due to some defect such as dust, stain or scar on or in the optical card surface, desired data recording can not be effected at all.

Further, according to the interleave technique proposed in the Japanese patent application, no frame-by-frame synchronization signals F are pre-formatted; instead, they are written when desired data are recorded onto the data recording area. Thus, due to ununiform speed of the optical card's relative reciprocating movement or the like, the frame-by-frame synchronization signals F could not be recorded accurately at predetermined locations, so that there would occur undesirable jitters in the reproduced signals.

SUMMARY OF THE INVENTION

It is therefore an object of the present invention to provide an information recording medium which allows data to be recorded thereon in either of directions of the medium's relative reciprocating movement to a recording/reproducing head and even when a header section (BOS section) has become unreadable due to a defect of the recording medium.

It is another object of the present invention to provide an information recording medium which allows a synchronization signal for each frame to be recorded accurately at a predetermined location thereof to thereby prevent occurrence of undesirable jitters in reproduced signals.

It is still another object of the present invention to provide a method for efficiently recording or reproducing information onto or from an information recording medium.

In order to accomplish the above-mentioned objects, the present invention according to a first aspect provides an information recording medium which comprises a plurality of information recording tracks, and a pair of header sections pre-formatted at fore and rear ends of each of the recording tracks, each of the header sections of each of the tracks containing at least address information identifying the track, whereby, when information is to be recorded or reproduced onto or from desired one of the tracks, the desired track can be accessed from either the fore end or the rear end by referring to either of the header sections thereof.

According to the above-mentioned first aspect of the invention, each information recording track has pre-formatted fore and rear header sections containing at least address information identifying the track, and reference to either of the header sections permits the information recording track to be accessed from either the fore end or the rear end of the track. Thus, when data are to be recorded, either of the fore and rear header sections can be accessed first irrespective of the direction of relative movement of the recording medium to the head (i.e., irrespective of whether the relative movement is in the fore-to-rear or rear-to-fore direction), and thus the data recording can be performed on the track after it has been ascertained, from the information contained in the header section, that the track is a desired track. With this arrangement to allow data to be recorded onto the recording medium in either of the directions, the recording speed can be substantially increased. Further, even when the information contained in one of the header sections has become unreadable due to a partial defect of the recording surface of the medium, desired data recording can nevertheless be effected during the relative movement of the medium as long as the information in the other header section is readable. This is very advantageous.

In one preferred embodiment, each of the header sections includes a section having a predetermined data group pre-formatted for bit synchronization (corresponding to the lead-in section), and a section having pre-formatted track address information (corresponding to the BOS section).

The present invention according to a second aspect provides a write-once information recording medium which comprises a plurality of information recording tracks, each of the tracks being comprised of a plurality of storing areas for a plurality of frames each corresponding to a predetermined data size, a predetermined synchronization signal being pre-formatted in the storing area for each of the frames. This arrangement permits information to be non-rewritably recorded onto the storing area for selected one of the frames by referring to the pre-formatted synchronization signal.

According to the above-mentioned second aspect of the present invention, a predetermined synchronization signal is pre-formatted in the storing area for each of the the frames in such a manner that information can be non-rewritably recorded onto the storing area for a desired frame by referring to the pre-formatted synchronization signal. With this arrangement, it is possible to eliminate the need for formatting a synchronization signal for each frame during data recording, and the frame-by-frame synchronization signals can be appropriately recorded at respective predetermined locations, without being influenced by ununiform speed of the relative reciprocating movement of the recording medium for recording operation in a recording/reproducing apparatus. This significantly simplifies the data recording operation and prevents occurrence of jitters in the reproduced signals.

The information recording medium of the invention may be constructed to have the above-mentioned first and and second aspects.

Further, the present invention provides a method for performing at least one of information recording and reproduction onto and from a write-once information recording medium, which comprises the steps of accessing desired one of the tracks at either of the fore and rear ends by referring to either of the header sections thereof when information is to be recorded or reproduced, moving the recording or reproducing head relative to the recording medium from one of the fore and rear ends to the other end of the accessed desired track, and recording or reproducing the information onto or from one of the storing areas for selected one of the frames, by referring to the pre-formatted synchronization signal during relative movement of the head to the recording medium.

According to the method of the present invention, it is possible to access a desired track from either the fore end or the rear end by referring to either of the fore and rear header sections, and by moving the head relative the accessed track from one of the fore and rear ends to the other end, it is also possible record or reproduce information in either of the directions of the relative reciprocating movement. This increases the speed and efficiency of recording or reproduction. Also, because information can be accurately recorded onto or reproduced from a desired track by referring to the pre-formatted synchronization signal in the course of the relative movement, the recording and reproducing accuracy can be increased.

As one preferred embodiment, in the step of recording the information, data of a series of information to be recorded may be scattered across the frames by interleaving in such a manner that pieces of the data are mixedly recorded within each of the frames. As another preferred embodiment, in the step of reproducing the information, reproduced data of the individual frames may be released from their interleaved state, so as to reproduce the series of the information. The series of information may include a data group of a plurality of bits and predetermined error correction codes.

BRIEF DESCRIPTION OF THE DRAWINGS

For better understanding of other objects, advantages and features of the present invention, the preferred embodiments of the invention will be described in detail hereinbelow with reference to the accompanying drawings, in which:

FIG. 1 is a plan view schematically showing an exemplary storage format of an optical card according to an embodiment of the present invention;

FIG. 2 is a diagram showing an exemplary recording format of one of the recording tracks in the information recording region of the optical card shown in FIG. 1;

DETAILED DESCRIPTION OF THE PREFERRED EMBODIMENTS

Figure 3:
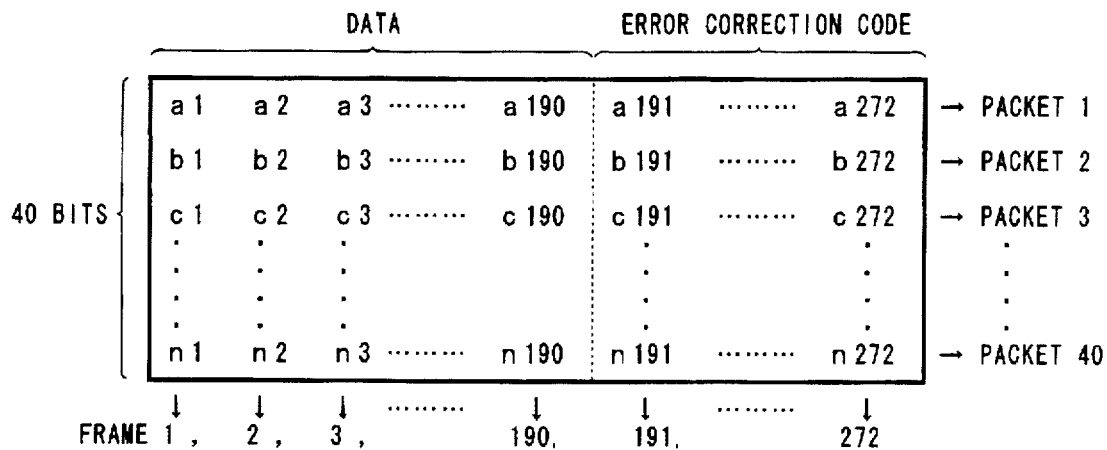
FIG. 3 is a data map explanatory of an exemplary interleave operation performed at the time of recording according to the present invention.

FIG. 1 is a schematic plan view showing an optical card 1 as an embodiment of a write-once information recording medium according to the present invention. On one surface of the optical card 1, there is provided a rectangular information recording region 2 which occupies about 60% of the total area of the surface. The information recording region 2 includes a central write-once data recording section 3 and two pre-formatted or pre-recorded header sections 4a and 4b located at both ends of the data recording section 3. The information recording region 2 has a plurality of information recording tracks extending in "x" direction in the figure and arranged in parallel to each other in "y" direction. The "x" direction is where a recording/reproducing head H (FIG. 4) is moved relative to the card 1 along the recording region 2 in order to record or reproduce information onto or from a particular information recording track, while the "y" direction is where the recording/reproducing head H is moved relatively across the recording region 2 in order to be properly positioned over a particular information recording track.

For convenience of description, one end (left side in FIG. 1) of the optical card 1 where the header section 4a is provided will be referred to as a fore end, while the other end (right side in FIG. 1) of the optical card 1 where the header section 4b is provided will be referred to as a rear end. Although not specifically shown, a plurality of servo-tracking guide tracks are also provided on the recording region 2, each interposed between adjacent information recording tracks, as well known in the art.

A further description will be made about an exemplary storing format of the recording tracks 21 in the information recording region 2, with reference to FIG. 2.

Each of the information recording tracks 21 includes a central write-once data recording area 31, and fore and rear header sections 4a1 and 4b1 located on opposite sides of the data recording track section 31. Such data recording area 31 and fore and rear header sections 4a1 and 4b1 of the individual recording tracks 21 together constitute the data recording section 3 and fore and rear header sections 4a and 4b of FIG. 1, respectively.

The fore header section 4a1 of each information recording track 21 is composed of a lead-in section 42a having a group of predetermined data pre-formatted for the purpose of bit synchronization, and a BOS (Beginning of Sector) section 43a having address information identifying that recording track 21. The lead-in section 42a is located adjacent to the extreme fore end of the recording track 21, and the BOS section 43a is located to the right of the lead-in section 42a, i.e., closer to the middle of the recording track 21. This arrangement is for the purpose of allowing the lead-in section 42a to be first read by the head H when the relative movement of the head H is in the backward (i.e., fore-to-rear) "x" direction. The lead-in section 42a contains 144-bit pre-formatted informational that is for example comprised of three sets or repetitions of 8-bit frame synchronization signal F and 40-bit synchronization signal S. The BOS section 43a contains 288-bit pre-formatted information that is for example comprised of six repetitions of 8-bit frame synchronization signal F, 14-bit track address information and other necessary information. For example, the frame synchronization signal F is a predetermined 8-bit coded signal, and the bit synchronization signal S comprises 40 information pits (40-bit data of logical "1").

The rear header section 4b1 of each of the information recording tracks 21 contains pre-formatted information that has the same contents but is arranged oppositely to that of the fore header section 4a1. That is, in the rear header section 4b1, lead-in section 42b is located adjacent to the extreme rear end of the recording track 21, and BOS section 43b is located to the left of the lead-in section 42b, i.e., closer to the middle of the track 21. This arrangement is for the purpose of allowing the lead-in section 42b to be first read by the head H when the relative movement of the head H is in the forward (i.e., rear-to-fore) "x" direction.

An 8-bit extreme-end frame synchronization signal F is added, at the extreme read end of the lead-in section 42b of the rear header section 4b1, so as to be first read by the head H when the relative movement of the head is in the forward (i.e., rear-to-fore) "x" direction. However, it is not necessary to add such an extreme-end frame synchronization signal F to the fore header section 4a1 because the extreme-fore-end data is originally the 8-bit frame synchronization signal F.

Referring next to the format of the data recording area 31 of each of the tracks 21, the track section 31 is comprised of storing areas for a plurality of frames, say, 272 frames, and each of the frames has a predetermined data size such as 48 bits. In each of the frame storing areas is pre-formatted a predetermined frame synchronizing signal F, so that information is non-rewritably recorded onto a desired frame storing area by referring to the pre-formatted synchronization signal F. As an example, one frame may have a size of 48 bits so that the synchronization signal F pre-formatted in the area has a size of 8 bits and the remaining 40 bits form an available data recording segment D. Namely, at the time of fabrication of the optical card 1, a total of 272 frame synchronization signals F are pre-formatted at constant intervals in predetermined locations of the data recording area 31, with the data recording segment D for each frame being left blank for the user's subsequent writing.

The term "pre-formatting" is used to mean pre-recording predetermined information such as bit synchronization signal S, frame synchronization signal F and header information A such as address information in accordance with predetermined standards at the time of fabrication of the optical card 1. Recording such pre-format information may be effected by use of any conventionally-known recording apparatus and method or technique, and hence will not be described here any further.

Next, a description will be made about an exemplary apparatus and method for recording and/or reproducing information onto and/or from the optical card 1 pre-formatted in the above-mentioned manner.

Figure 4:
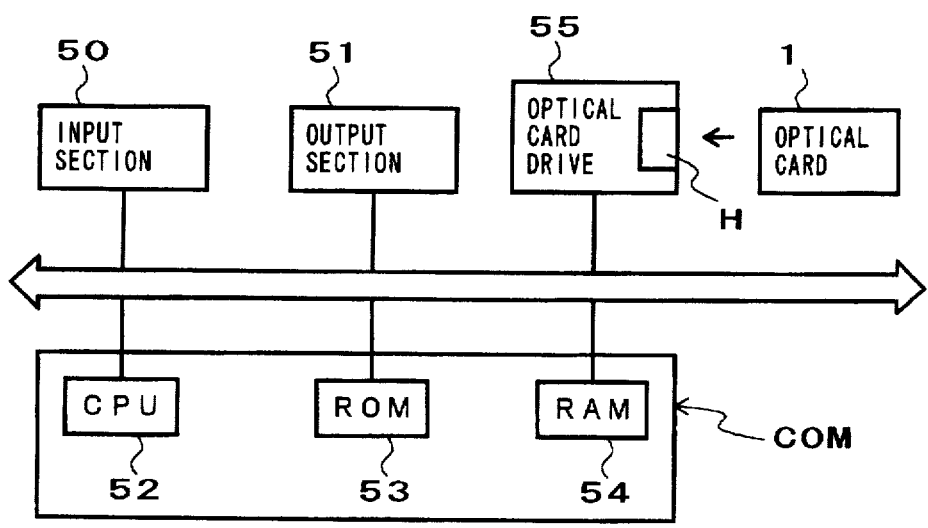
FIG. 4 is a block diagram showing the general arrangement of an apparatus for carrying out an information recording/reproducing method according to the present invention.

FIG. 4 is a block diagram showing an exemplary general hardware structure of the optical information recording/ reproducing apparatus employed in the present invention. Input section 50 of the device includes various input means such as a keyboard, operation panel and other device for inputting data of information to be recorded onto the optical card 1 and various operational instructions to the apparatus. Output section 51 includes various output means such as for printing reproduced data and outputting video and audio data. Microcomputer COM which comprises CPU 52, ROM 53 and RAM 54 controls the recording and reproducing operations in the recording/reproducing apparatus. Under the control of the microcomputer COM, optical card drive 55, in which the optical card 1 is removably set in place, records and/or reproduces information onto and/or from the optical card 1.

Figure 5:
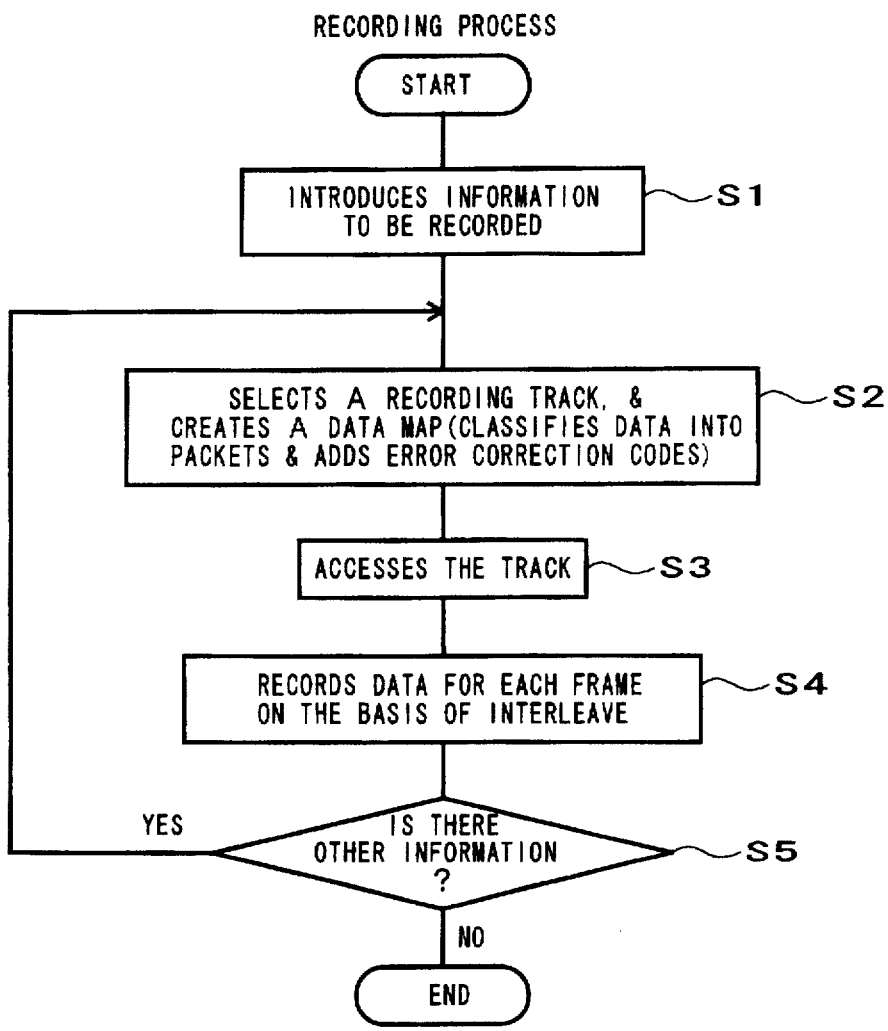
FIG. 5 is a flowchart showing an exemplary program for carrying out the information recording method according to the present invention.
Figure 6:
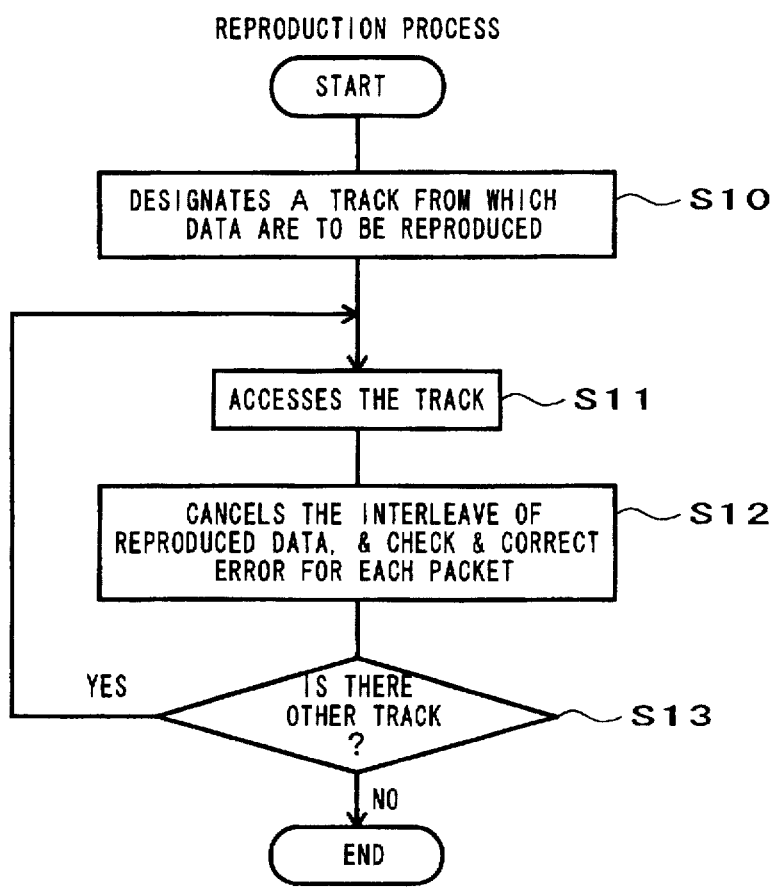
FIG. 6 is a flowchart showing an exemplary program for carrying out the information reproducing method according to the present invention.
Figures 7, 8, 9:
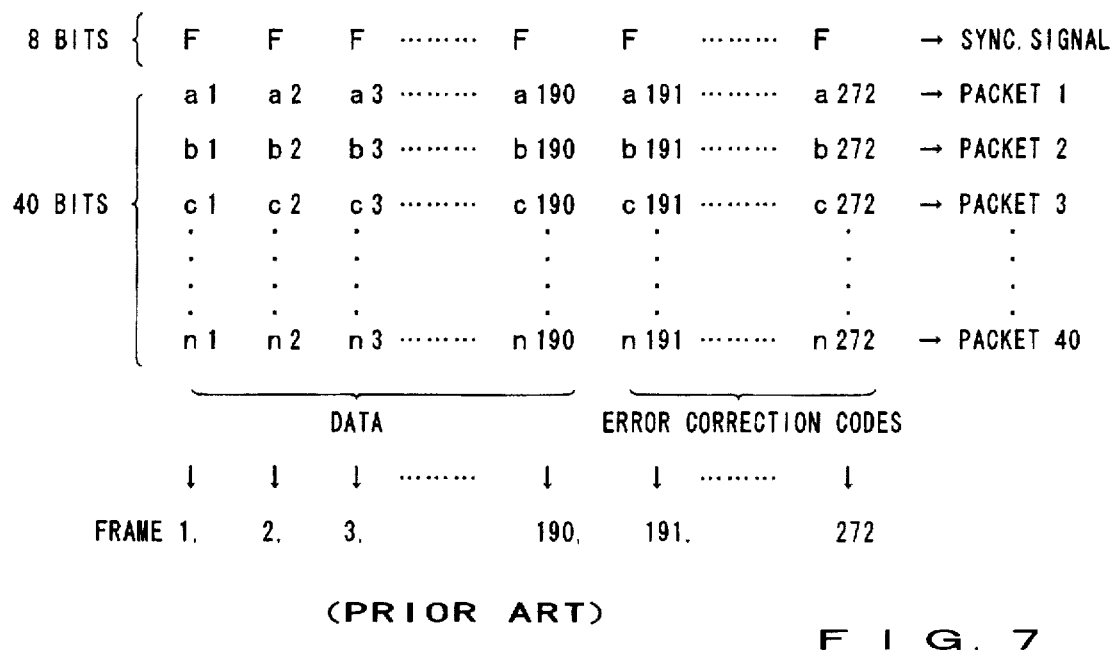
FIG. 7 is a data map explanatory of the interleave operation performed in prior art.
FIG. 8 is a diagram showing an exemplary frame structure built by rearranging the data of FIG. 7 in accordance with the prior interleave technique.
FIG. 9 is a diagram showing an exemplary recording format of one of the recording tracks in a prior art recording medium.

FIG. 5 is a flowchart of a program, to be executed by the CPU 52, for recording information onto the optical card 1 set in the optical card drive 55.

First, at step S1, information to be recorded is introduced via the input section 50. At next step S2, the CPU 52 selects one of available (writable or blank) recording tracks 21 in the data recording region 3 of the card 1 and creates a data map of the introduced information in correspondence with the selected track 21. In preparing the data map, the to-be-recorded information is classified into a plurality of packets each having a predetermined data size (e.g., 190 bits), and error correction codes having a predetermined number of bits (e.g., 85 bits) are added to each of the packets. Thus, for each of the packets, this procedure creates a data group of one or more packets each having 272 bits.

Then, for the selected track 21, the information and error correction codes of each packet are stored into a predetermined recording/reproducing buffer memory in the form of a matrix data map having 40 rows and 272 columns as shown in FIG. 3. At this time, if all the data recording areas D of the track 21 are available for recording, the to-be-recorded information will be temporarily stored into the buffer in correspondence with all the data map areas; however, if data has already been recorded on the recording areas corresponding to packets 1 and 2 with the remaining recording areas corresponding to packets 3 to 40 being available for recording, the to-be-recorded information will be temporarily stored into the buffer at its map locations c1–c272 to n1–n272 and not at its map locations a1–a272 to b1–b272. As will be described later, this permits efficient write-once recording even onto scattering empty recording areas. Preferably, RAM of the optical card drive 55 (not shown) is used as the above-mentioned recording/reproducing buffer memory, although the RAM 54 of the microcomputer COM may be used.

Next, at step S3, the recording/reproducing head H which is provided in association with the optical card drive 55 is caused to access the selected recording track 21. As the head H is moving relative to the track 21, it is possible to ascertain whether or not the recording/reproducing head H is actually accessing the selected recording track 21, by referring to the header information A including the track address information pre-formatted in the BOS section of the header section 4a1 or 4b1. Because the two BOS sections 43a and 43b are provided at the opposite ends of the track 21, one of the sections 43a and 43b can always be referred to and hence recording of the information can be effected, irrespective of the direction of the relative oscillating movement of the recording/reproducing head (the forward or backward "x" direction) to the optical card 1. Further, even when some defect in the recording surface of the optical card 1 prevented the information of one of the BOS sections 43a or 43b from being read out properly during the relative movement of the head H in the backward "x" direction, data recording can be effected as the head H is moved relative to the track 21 in the reversed "x" direction, as long as the other BOS section 43b or 43a is readable.

Once it has been ascertained that the recording/reproducing head H is actually accessing the selected recording track 21, the optical card drive 55 continues the forward or backward relative movement of the recording/reproducing head H along the track 21, during which time it performs the following recording process on the optical card 1.

That is, at step S4, the data of the individual frames are read out from the data map (FIG. 3) stored in the recording/reproducing buffer memory and are sequentially recorded onto the corresponding recording areas D (FIG. 2) in an interleave fashion. More specifically, when the relative movement of the recording/reproducing head H is in the backward "x" direction arrowed in FIG. 2, 40-bit data comprising respective first bit data of packets 1–40 arranged in the order of "a1, b1, c1, . . . n1" are read out in a serial manner and stored into the recording segment D corresponding to frame 1. Next, 40-bit data comprising respective second bit data of packets 1–40 arranged in the order of "a2, b2, c2, . . . n2" are read out in a serial manner and stored into the recording segment D corresponding to frame 2. Thus, by reading out from the data map the respective row bits of the individual packets column by column, data trains of 272 frames (frame 1 to frame 272) are created and are recorded onto the corresponding recording areas D of the optical card 1. Because during this time the presence of the recording segment D for each frame can be confirmed by reference to the pre-formatted frame synchronization signal F, the data of each frame can be recorded onto accurate storing locations of the optical card 1 even when the relative movement speed of the recording/reproducing head has become ununiform. Of course, in this case, the frame-by-frame data recording is performed while jumping over such storing locations corresponding to already-recorded packets (e.g., if packets 1 and 2 have been already recorded, then the storing locations for data A1–a272 and b1–b272 are jumped over).

In the case where the relative movement of the recording/reproducing head H is in the opposite direction to the arrowed "x" direction of FIG. 2, the data map is read in the opposite direction to the above-mentioned, i.e., in the order of n272, . . . b272, a272 and n1, . . . c1, b1, a1, so that all the data can be recorded in the same direction. Conversely, even where the relative movement of the recording/reproducing head H is in the opposite direction to the arrowed "x" direction of FIG. 2, the data map may be read in the above-mentioned direction so that the data recorded direction varies among the recording tracks 21. In such a case, a flag indicative of the direction of the recorded data may be recorded in the header sections 4a1 and 4b1 for each recording track 21 so that the data can be rearranged with reference to the flag during reproduction.

Once the data recording has been completed for one track 21 in the above-mentioned manner, it is examined whether there is other information to be recorded. If so, the CPU 52 loops back to step S2 to repeat the above-mentioned operations. Namely, the CPU 52 selects any of the available recording tracks 21 in the data recording region 3 of the optical card 1, so that the data recording is performed on the selected track 21 in the above-mentioned manner. Because available recording tracks are often adjoining to each other in write-once information recording media, the recording track 21 adjoining the track 21 used in the last cycle may be selected and the other to-be-recorded information may be recorded on the selected adjoining recording track 21.

Now, a description will be made about an exemplary program, to be executed by the CPU 52, for reproducing information from the optical card 1 set in the optical card drive 55.

First, at step S10, the CPU 52 designates one or more tracks 21 from which to reproduce the recorded data. At next step S11, the recording/reproducing head H of the optical card drive 55 is caused to access the designated track 21. As mentioned earlier in connection with the recording process, it is possible to ascertain whether or not the recording/ reproducing head H is actually accessing the designated track 21, by referring to the header information A containing the track address information pre-formatted in the BOS section 43a or 43b of the header section 4a1 or 4b1 as the head H is moving relative to the track 21. Because the two BOS sections 43a and 43b are provided at the opposite ends of the track 21, one of the sections 43a and 43b can always be referred to and hence reproduction of the information can be effected, irrespective of the direction of the relative movement of the recording/reproducing head H. Even with the conventional optical cards having only one BOS section, the recording/reproducing head H is allowed to move relative to the card in either of the directions at the time of reproduction because no particular inconvenience would not arise from confirming the track address after reading out the recorded data on the track 21. However, if the BOS sections are provided at the opposite ends of the card as in the present invention, improper access to a wrong track 21 can be readily detected to immediately stop the reproducing operation on the track 21, which will significantly improve the reproducing efficiency.

Once it has been ascertained that the recording/ reproducing head H is accessing the designated track 21, the optical card drive 55 continues the forward or backward relative movement of the recording/reproducing head H along the track 21, during which time it performs the following reproduction process.

At step S12, the data reproduced for each frame from the designated track 21 are temporarily stored into the above-mentioned recording/reproducing buffer memory. Then, the data for each packet are read out from the buffer memory after the data has been released from the interleaved state, and the reproduced packet data (190 bits) are checked and corrected for any possible error by use of the error correction codes (82 bits).

Then, at step S13, it is examined whether the data on all the designated tracks 21 have been reproduced. If not, i.e., if there is another track 21 to be reproduced, the CPU 52 loops back to step S11 to repeat the above-mentioned operations for the unreproduced track.

Because the reproduction is performed on the data of the individual frames which are, as mentioned earlier, recorded on accurate storing locations on the basis of the respective frame synchronization signals irrespective of whether the relative movement speed of the recording/reproducing head is uniform or not, it is possible to acquire good-quality reproduced signals with no jitters. In addition, by reproducing the data recorded scatteringly on the basis of the interleave technique, the present invention can correct error easily without being influenced by any defect of the data recording areas such as dust, stain or scar.

It should be understood that various modifications are possible without departing from the basic features of the present invention. As an example, the present invention may be applied to any other write-once information recording media than the optical card, such as an optical disk where one circular track comprises a plurality of sectors and each of the sectors is an unit to be accessed. Namely, in rotary recording media such as the optical disk, each sector may be considered as one information recording track of the present invention. The pre-formatting of two header sections at the opposite ends of each track in the present invention, which allows the relative movement of the recording/reproducing head to be in either of the forward and backward "x" directions, may not have to be applied to the rotary recording media rotatable only in a single direction. However, the pre-formatting of frame-by-frame synchronization signals may be applied to the single-direction rotary recording media.

The present invention may of course be applied to two-surface-recording optical cards as well as to single-surface-recording optical cards. It should be apparent that the present invention is also applicable to hybrid-type information recording media which for example have a function of an optical card and a function of another recording medium such as an IC or magnetic card.

In summary, the present invention is characterized in that each information recording track has pre-formatted fore and rear header sections containing at least address information identifying the track and reference to one of the header sections permits the information recording track to be accessed in either of the forward and backward directions at the time of recording or reproduction. Thus, when recording data, one of the fore and rear header sections can be accessed first irrespective of the direction of the relative movement of the recording medium to the head, and thus the data recording can be performed on the track after it has been ascertained from the header section that the track is a desired track. With this arrangement to allow data to be recorded onto the recording medium in either of the directions, the recording speed can be increased to a substantial degree. Further, even when the information recorded on one of the header sections has become unreadable due to a partial defect of the recording surface of the medium, desired data recording can be effected by the relative movement of the medium as long as the information recorded on the other header section is readable. This is very advantageous.

The present invention is also characterized by predetermined synchronization signals pre-formatted in the storing areas for the individual frames in such a manner that information can be recorded on the storing area for a given frame by referring to the pre-formatted synchronization signal. With this arrangement, it is possible to eliminate the need for formatting a synchronization signal for each frame at the time of recording and to always record the frame-by-frame synchronization signals accurately at respective predetermined locations, without being influenced by ununiform speed of the relative reciprocating movement of the recording medium for recording in a recording/reproducing apparatus. This significantly simplifies the data recording operation and prevents occurrence of jitters in the reproduced signals.

Furthermore, with the method of the present invention, it is possible to access a desired track from either its fore end or its rear end by referring to either of the fore and rear header sections, and by moving the head relative the accessed track backwardly or forwardly, it is also possible record or reproduce information from either of the directions of the relative reciprocating movement. This can increase the speed and efficiency of recording and reproduction. Also, because information can be accurately recorded onto or reproduced from a desired track by referring to the pre-formatted synchronization signal during the relative movement, the recording and reproducing accuracy can be increased.

What is claimed is:

1. A information recording medium comprising:

a plurality of information recording tracks, each said track being comprised of a plurality of storing areas for a plurality of frames each corresponding to a predetermined data size; and a pair of header sections pre-formatted at fore and rear ends of each said recording track, each of said header sections of each said track containing at least address information identifying said track, a predetermined synchronization signal being pre-formatted in said storing area for each of the frames.

2. An information recording medium as defined in claim 1 wherein each of said header sections includes a section having a predetermined data group pre-formatted for bit synchronization, and a section having pre-formatted track address information.

3. A method for recording information on a write-once information recording medium, the recording medium including a plurality of information recording tracks and a pair of header sections pre-formatted at fore and rear ends of each of the recording tracks, each of the recording tracks being comprised of a plurality of storing areas for a plurality of frames each corresponding to a predetermined data size, a predetermined synchronization signal being pre-formatted in the storing area for each of the frames, each method comprising the steps of:

accessing A desired one of said tracks at either of the fore and rear ends by referring to either of said header sections thereof;

moving a recording head relative to the recording medium from one of the fore and rear ends to the other end of said accessed desired track; and recording the information onto one of said storing areas for a selected one of the frames, by reading the pre-formatted synchronization signal during relative movement of the head to said recording medium.

4. A method as defined in claim 3 wherein in said step of recording the information, data of a series of information to be recorded is scattered across the frames by interleaving in such a manner that individual pieces of the data are mixedly recorded within each of the frames.

5. A method as defined in claim 4 wherein the series of information contains a data group of a plurality of bits and error correction codes.

6. A method as defined in claim 3 wherein said information recording medium is an optical information recording card.

7. A method as defined in claim 3 wherein said synchronization signal comprises a coded signal of a plurality of bits.

8. A method for reproducing information from a write-once information recording medium, the recording medium including a plurality of information recording tracks and a pair of header sections pre-formatted at fore and rear ends of each of the recording tracks, each of the recording tracks being comprised of a plurality of storing areas for a plurality of frames each corresponding to a predetermined data size, a predetermined synchronization signal being pre-formatted in the storing area for each of the frames, said method comprising the steps of:

accessing A desired one of said tracks at either of the fore and rear ends by referring to either of said header sections thereof;

moving a reproducing head relative to the recording medium from one of the fore and rear ends to the other end of said accessed desired track; and reproducing the information from one of said storing areas for a selected one of the frames, by referring to the pre-formatted synchronization signal during relative movement of the head to said recording medium.

9. A method as defined in claim 8 wherein data of a series of information to be recorded is scattered across the frames by interleaving in such a manner that individual pieces of the data are mixedly recorded within each of the frames, and wherein said step of reproducing the information includes a first step of reproducing data for each of the frames and a second step of reproducing the series of information by deinterleaving on the basis of reproduced data of the individual frames.

10. A method as defined in claim 9 wherein the series of information contains a data group of a plurality of bits and error correction codes.

11. A method as defined in claim 8 wherein said information recording medium is an optical information recording card.

12. A method as defined in claim 8 wherein said synchronization signal comprises a coded signal of a plurality of bits.

* * * * *